(12) United States Patent
Tian et al.

(10) Patent No.: US 7,027,210 B2
(45) Date of Patent: Apr. 11, 2006

(54) METHOD AND SYSTEM FOR DETERMINING GAIN FOR AN OPTICAL SIGNAL

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 10/448,579

(22) Filed: May 29, 2003

(65) Prior Publication Data

US 2004/0240040 A1 Dec. 2, 2004

(51) Int. Cl.
*H01S 3/00* (2006.01)
*H04B 10/00* (2006.01)

(52) U.S. Cl. .................. 359/333; 398/30; 398/181

(58) Field of Classification Search .............. 359/333; 398/30, 181
See application file for complete search history.

(56) References Cited

U.S. PATENT DOCUMENTS

| | | | | |
|---|---|---|---|---|
| 4,692,607 A | | 9/1987 | LaBelle et al. ............. 250/205 |
| 5,463,487 A | | 10/1995 | Epworth ...................... 359/124 |
| 5,500,756 A | * | 3/1996 | Tsushima et al. ........... 398/181 |
| 5,646,399 A | | 7/1997 | Fukushima et al. ......... 250/226 |
| 5,907,429 A | * | 5/1999 | Sugata ................... 359/341.42 |
| 6,023,366 A | * | 2/2000 | Kinoshita .............. 359/337.12 |
| 6,120,190 A | | 9/2000 | Leard et al. .................. 385/88 |
| 6,275,330 B1 | | 8/2001 | Izumi .................... 359/341.42 |
| 6,323,994 B1 | | 11/2001 | Li et al. .................. 359/341.1 |
| 6,373,574 B1 | | 4/2002 | Gu et al. ..................... 356/419 |
| 6,377,592 B1 | | 4/2002 | Auracher et al. .............. 372/9 |

(Continued)

FOREIGN PATENT DOCUMENTS

JP 11-145910 5/1999

(Continued)

OTHER PUBLICATIONS

Kuniaki Motoshima et al., "A Channel-Number Insensitive Erbium-Doped Fiber Amplifier With Automatic Gain and Power Regulation Function," Journal of Lightwave Technology, vol. 19, No. 11, pp. 1759-1767, Nov. 2000.

(Continued)

*Primary Examiner*—Mark Hellner
*Assistant Examiner*—Eric Bolda
(74) *Attorney, Agent, or Firm*—Baker Botts L.L.P.

(57) ABSTRACT

A method for determining gain for an optical signal includes measuring a first power level that is an output power level of an optical signal at a first optical node, communicating the optical signal to a second optical node, and communicating the first power level to the second optical node in an optical supervisory channel of the optical signal. The method further includes receiving the optical signal at the second optical node, measuring a second power level of the optical signal at the second optical node, and determining a gain for the optical signal based on the first and second power levels.

13 Claims, 3 Drawing Sheets

U.S. PATENT DOCUMENTS

| | | | |
|---|---|---|---|
| 6,411,407 B1 | 6/2002 | Maxham | 359/110 |
| 6,417,962 B1 | 7/2002 | Amin et al. | 359/341.1 |
| 6,423,963 B1 | 7/2002 | Wu | 250/227.14 |
| 6,480,329 B1 | 11/2002 | Sugaya et al. | 359/341.42 |
| 6,486,950 B1 | 11/2002 | Munks et al. | 356/326 |
| 6,636,659 B1 * | 10/2003 | Kagi et al. | 385/24 |
| 6,856,453 B1 * | 2/2005 | Hainberger et al. | 359/334 |
| 2002/0027703 A1 * | 3/2002 | Kinoshita et al. | 359/337.1 |
| 2002/0051284 A1 * | 5/2002 | Takatsu et al. | 359/341.1 |
| 2002/0080438 A1 | 6/2002 | Beine et al. | 359/110 |
| 2002/0126952 A1 * | 9/2002 | Shirai | 385/24 |
| 2002/0186459 A1 | 12/2002 | DeGrange, Jr. et al. | 359/341.4 |
| 2003/0035170 A1 | 2/2003 | DeGrange, Jr. et al. | 359/124 |
| 2003/0035171 A1 | 2/2003 | Touma | 359/124 |
| 2003/0095323 A1 * | 5/2003 | Onaka et al. | 359/334 |

FOREIGN PATENT DOCUMENTS

WO    WO 2056509 A1 *   7/2002

OTHER PUBLICATIONS

S. Kinoshita et al., "Wide-Dynamic-Range WDM Optical Fiber Amplifiers for 32×10 Gb/s, SMF Transmission Systems," Fujitsu Laboratories Ltd., 4 pages, date unknown.

Notification of Transmittal of the International Search Report or the Declaration (PCT Rule 44.1) mailed Nov. 9, 2004, re International Application No. PCT/US2004/016321, 13 pages.

* cited by examiner

METHOD AND SYSTEM FOR DETERMINING GAIN FOR AN OPTICAL SIGNAL

TECHNICAL FIELD OF THE INVENTION

This invention relates in general to optical communication networks, and more particularly to a method and system for determining gain for an optical signal.

BACKGROUND OF THE INVENTION

Sustaining power levels of optical signals in optical networks presents substantial technical challenges. It is desirable for the power of the signals to be within a dynamic range of the receivers in an optical network, and the dynamic range of the receivers tends to be smaller for higher data rates. Consequently, it is important to employ an accurate method for assessing the necessary level of amplification in nodes in an optical network.

One method for determining the amplifier gain for a signal is to measure a pilot tone. One example of a pilot tone system is the Mitsubishi Electric System described by Motoshima et al. in the *Journal of Lightwave Technology*, vol. 19, page 1759 (2001). The pilot tone is a dummy channel located within the same band as information-carrying channels in an optical signal. The power of the pilot tone is measured to indicate the overall power level of the signal. But the pilot tone only provides a power measurement from one channel, and the pilot tone channel may not be used to carry information.

An alternative method is the use of telemetry to communicate power levels. In the telemetry method, information about the number of provisioned channels is communicated to each node, along with information about the number of nodes through which the signal has passed. The number of channels is used to compute an expected output power level, while the number of nodes is used to analyze the amount of accumulated amplified spontaneous emission (ASE), a form of noise resulting from stimulated amplification of the spontaneous emission in an amplifier gain medium. Telemetry relies upon calculations, such as ASE calculations, that may not be completely accurate, and can vary in actual network conditions. Furthermore, the uncertainties may accumulate so that the error is more significant in networks with a large number of nodes.

SUMMARY OF THE INVENTION

In accordance with the present invention, a method and system for determining gain for an optical signal are provided. In particular, certain embodiments of the present invention provide an output power level from a network node that is shared between nodes, allowing nodes to calculate an amount of loss over a fiber span. This information permits measured rather than estimated determinations of span loss and thus permits setting the gain of the optical amplifiers in response to changes in span loss caused by temperature, network upgrades, and other factors that affect span loss.

In a first embodiment, a method for determining a gain for an optical signal includes measuring a first power level that is an output power level of an optical signal at a first optical node, communicating the optical signal to a second optical node, and communicating the first power level to the second optical node in an optical supervisory channel of the optical signal. The method further includes receiving the optical signal at the second optical node, measuring a second power level of the optical signal at the second optical node, and determining a gain for the optical signal based on the first and second power levels.

Important technical advantages of certain embodiments of the present invention include improved accuracy in setting the gain of optical amplifiers. Existing methods, such as telemetry, may rely on calculations that are inexact or approximate. By contrast, certain embodiments of the present invention provide a more direct measurement of span loss, which makes those embodiments more adaptable and flexible in actual operating conditions.

Other important technical advantages of certain embodiments of the present invention include adaptability to existing systems. Pilot tone systems, for example, may be relatively accurate in terms of determining the power level, but they also require that a channel be allocated solely for the purpose of setting amplifier gain. Furthermore, detecting the power level of a pilot tone requires optical components to extract the particular wavelength of pilot tone. By contrast, certain embodiments of the present invention use existing optical supervisory channels to communicate power information between nodes, thus simplifying the process of exchanging power information between nodes, and determining span loss.

Yet another important technical advantage of certain embodiments of the present invention is adaptability to optical networks that do not illuminate channels when the channel is not carrying data between nodes. In such networks, the number of channels may change from node to node, and tracking those changes in real time may involve some technical challenges. By measuring the power level directly, certain embodiments of the present invention avoid the need to calculate expected power levels based on the number of channels, and thus require less information exchange overall. Furthermore, gain can be determined based on power measurements of the ASE when the optical signal is not illuminated otherwise. This allows the gain to be updated for changing conditions that affect span loss even when the optical signal (apart from the optical supervisory channel) is not present.

Still other important technical advantages of certain embodiments of the present invention include setting amplifier gain in nodes of a bidirectional optical network using a gain determined by a node that is "downstream" in one direction to assist in the determination of a gain in the opposite direction. When a node that is downstream with respect to a first direction calculates a span loss using measured power levels, the downstream node may communicate the span loss to a node that is upstream with respect to the first direction. This allows the upstream node to set the amplifier gain in the opposite direction to match the gain of the downstream node in the first direction, rather than performing separate measurements and calculations.

Particular embodiments of the present invention may include some, all, or none of the enumerated technical advantages. Additional technical advantages will be apparent to one skilled in the art from the figures, description, and claims included herein.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
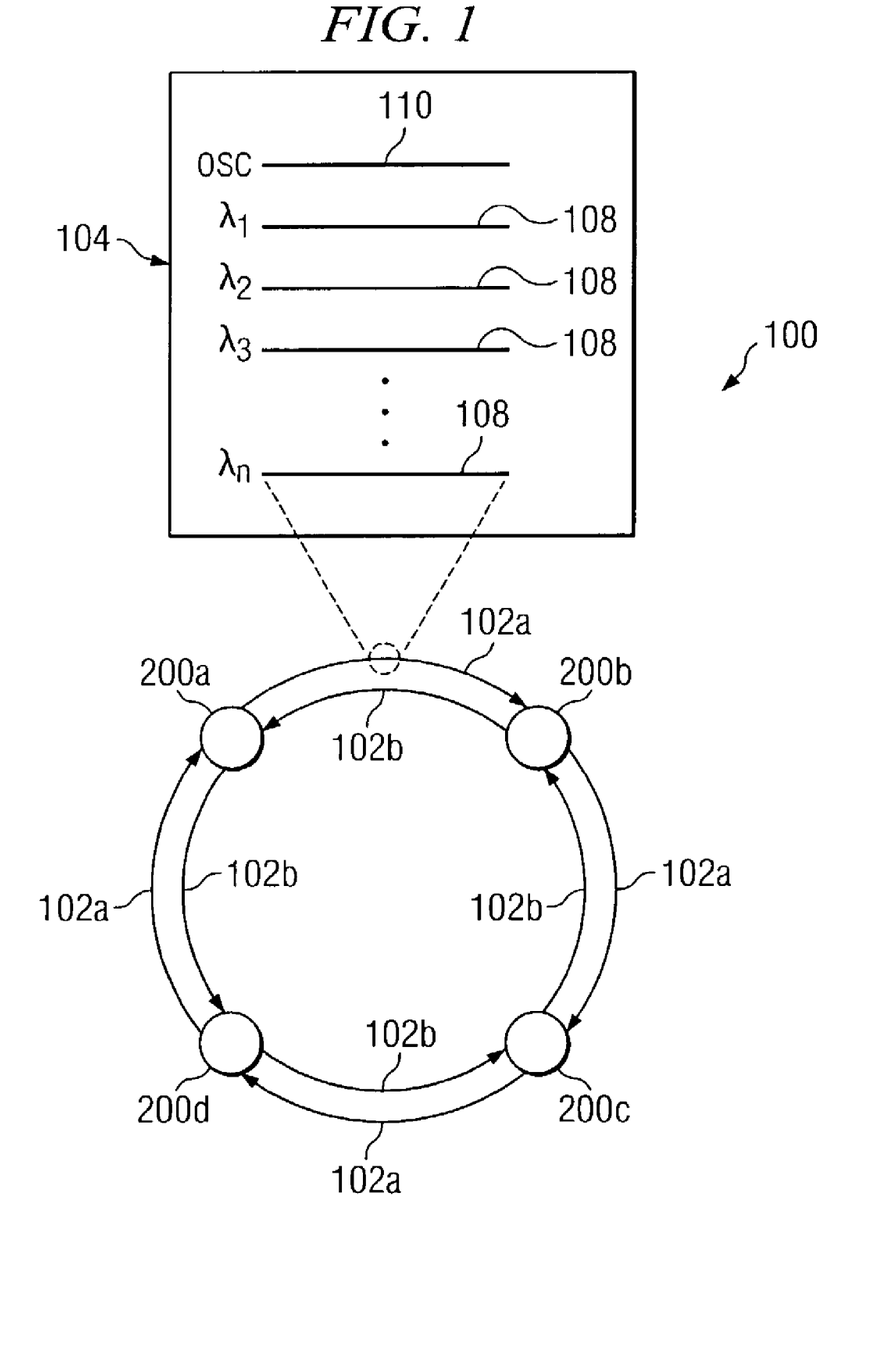
FIG. 1 shows an optical communication network with network nodes that share power level information in accordance with particular embodiments of the present invention.

FIG. 1 shows an optical network 100 that communicates information between network nodes 200 using optical connections 102. Optical network 100 generally represents any collection of hardware and/or software that communicates information between network nodes 200 in the form of optical signals. In a particular embodiment, optical network 100 uses wavelength division multiplexing (WDM) or dense wavelength division multiplexing (DWDM) to communicate information on multiple channels, each channel using a different wavelength. Network nodes 200, referring generally to nodes 200a, 200b, 200c, and 200d, represent any hardware and/or software that receives information carried in optical network 100 in the form of optical signals, processes that information in any suitable fashion, and/or communicates information to optical network 100. Nodes 200 may include optical switches, amplifiers, add-drop multiplexers, optical-electronic converters, or any other suitable hardware and/or software for processing optical signals.

Connections 102 between network nodes 200 represent any suitable links for communicating optical signals 104 between network nodes 200. As such, connections 102 may include any manner of optical communication medium, including optical fibers such as single-mode fiber, dispersion compensation fiber, dispersion-shifted fiber, non-zero dispersion shifted fiber. Connections 102 may carry information using any suitable format or protocol, including frame relay, asynchronous transfer mode (ATM), synchronous optical network (SONET), or any other suitable method of communication. Connections 102 may be unidirectional or bidirectional. In many networks, there is an "eastbound" path traveling clockwise around optical network 100, and a "westbound" path, which communicates information counterclockwise around optical network 100. Each connection 102 may include one or multiple optical fibers or other media for communicating optical signals 104, and nodes 200 of optical network 100 may be arranged in any suitable configuration, including rings, stars, or other suitable network configuration.

In a particular embodiment, connections 102 carry optical signals 104 that have a wavelength spectrum of the form shown in FIG. 1. In signal 104, the optical information is apportioned in several different wavelengths 108. Each wavelength 108 represents a particular channel. Information carried on connection 102 may be assigned to any particular wavelength 108 and optical signal 104. Using appropriate equipment, wavelengths 108 may be added, dropped, switched, or otherwise processed separately. Signal 104 also includes an optical supervisory channel (OSC) 110 that represents one or more wavelengths assigned to carry information used for management of network 100. For example, OSC 110 may communicate status information for the channels 108 indicating whether each channel 108 is provisioned and whether there has been an error detected in communication of channel 108. Any number of wavelengths may be assigned to OSC 110 for carrying network management information.

As optical signals 104 are communicated in connections 102, they are attenuated by interactions of signals 104 with the optical media of connections 102. The attenuation in optical signals 104 from being communicated in connections 102 is known as "span loss." This span loss, together with other optical components, reduces the power of optical channels. Because receivers in an optical network function optimally within a certain dynamic range, it is desirable to compensate for the decreased power of optical signals by, for example, using optical amplifiers.

One method of compensating for span loss and power tilt involves the use of erbium-doped fiber amplification (EDFA). In EDFA, erbium-doped optical fibers are driven to excited states by a pumping laser, producing population inversion with excited erbium particles that amplify optical signals. It is desirable that the gain of the EDFA is set accurately so that the power levels of the signals arriving at the receivers are within the dynamic range of the receivers. This process is described in greater detail in conjunction with the description of node 200b in FIG. 2, but it suffices to say at this point that it is useful to have an accurate determination of span loss in order to properly set the EDFA gain at nodes 200.

In existing systems, two methods of determining span loss are the use of a pilot tone and the use of telemetry. In a pilot tone system, one of the channels in optical signal 104 is left unassigned. The purpose of the pilot tone is to provide a reference signal for measuring the power level of optical signal 104. The pilot tone is extracted by a receiving node 200 and the power of the pilot tone is measured using conventional techniques such as photodetectors. The power level of the pilot tone is used to calculate the necessary amplification level for optical signal 104. Although generally accurate, pilot tones may encounter difficulties when there is an occurrence in the network that causes the particular wavelength to fail or to be otherwise impaired that does not effect all wavelengths equally. Other drawbacks include the inability to assign information to the pilot tone channel. In addition, implementing a pilot tone requires components to emit, insert, and extract the pilot tone and to measure the power level of the pilot signal, which may increase the cost of node 200.

Another alternative method for determining span loss and appropriate gain is the use of telemetry. In telemetry systems, information about the number of channels provisioned is communicated to nodes 200 of network 100. The number of channels may be multiplied by the desired power level for each channel to determine a desired total power level, and the gain of optical amplifiers may be adjusted to obtain the desired power level. However, the accumulated noise resulting from amplified spontaneous emission (ASE) may affect the power level of the incoming signal. For this reason, the telemetry adjusts for ASE using a calculated factor based on the number of nodes that amplify optical signal 104. Unfortunately, the ASE calculations are based on estimates and averages that may not correlate with the real level of ASE. Moreover, as the number of nodes 200 in network 100 increases, this uncertainty in ASE becomes more significant. Particularly, in networks 100 where the number of illuminated channels may change from node to node and from time to time, it may be difficult to maintain accurate telemetry information, and to modify the telemetry information for each separate node 200.

In contrast with previous methods, nodes 200 of network 100 exchange power level information and calculate accurate span losses over each connection 102 based on the exchange of power information measured at each node 200.

In particular, certain embodiments use OSC 110 to communicate output power levels for optical signals 104 at each node 200. Thus, each node 200 receives output power level information in OSC 110 from the upstream node 200, compares the received output level to a measured input power level at that node 200, and determines a span loss based on the comparison. Thus, nodes 200 of network 100 provide techniques for measuring span loss directly. In this way, the gain level may be accurately set to compensate for a real span loss rather than an estimated span loss. Furthermore, the adjustment may be made without requiring assignment of a channel to a pilot tone, which effectively reduces the number of channels available to carry data. Also, because the power level is not measured based on a single channel, but rather the entire signal 104, the accuracy is not significantly impaired by factors that affect a single wavelength differently than others.

In one mode of operation, node 200a measures an output power level for output signal 104. Node 200a communicates this power level to node 200b as part of OSC 110. Node 200b receives the information and compares the output power level to an input power level for optical signal 104 received by node 200b. Based on the comparison of the input power level to the output power level, node 200b may determine a span loss. Node 200b then adjusts an amplification level for the signal to compensate for the span loss, taking into account any component loss that may be imparted to signal by node 200b. Thus, node 200b is able to accurately compensate for span loss using actual measured power levels, as opposed to estimates for span loss.

In particular embodiments, the gain may also be communicated between nodes 200 in bidirectional optical networks 100. Thus, for example, node 200a may communicate optical signals 104 to node 200b in a clockwise direction, while node 200b also communicates optical signals to node 200a in the counter-clockwise direction. Downstream node 200b determines a gain based on the span loss of link 102 between node 200a and 200b. After downstream node 200b determines a suitable gain, it communicates the gain to upstream optical node 200a, possibly using optical supervisory channel 110 of upstream signal 104 to communicate the information. Upstream optical node 200a sets an amplifier gain for counter-clockwise signals to match the amplifier gain downstream optical node 200b uses for clockwise optical signals 104. Assuming that the span loss is equivalent in the clockwise and counter-clockwise directions, this provides a relatively accurate determination of the necessary gain when there is no light available in a counter-clockwise direction between node 200b and node 200a to allow node 200a to determine the gain of its optical amplifier using the described techniques.

A particular technical advantage of certain embodiments is adaptability to optical networks that do not illuminate channels when the channel is not carrying data between nodes. In such networks, the number of channels may change from node to node and from time to time, and tracking those changes based on existing techniques may involve some errors. By measuring the power level directly, certain embodiments of the present invention avoid the need to calculate expected power levels based on the number of channels, and thus require less information exchange overall. Furthermore, gain can be determined based on power measurements of optical supervisory channel 110 when optical signal 104 is not otherwise illuminated. This allows the gain to be updated for changing conditions that affect span loss even when optical signal 104 is not present apart from optical supervisory channel 110.

Figure 2:
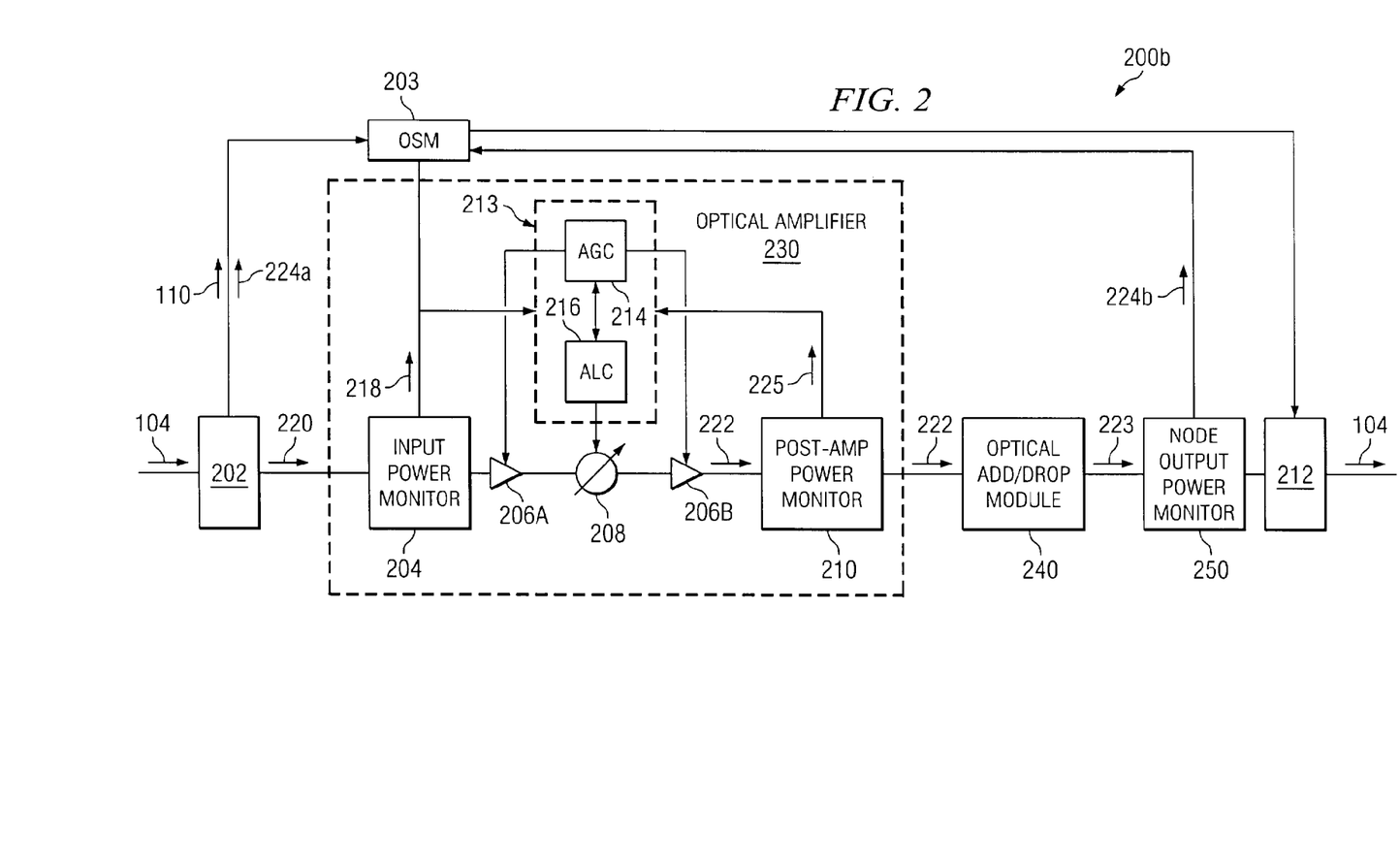
FIG. 2 is an illustration of a network node in the network of FIG. 1.

FIG. 2 illustrates a particular embodiment of node 200b. In the depicted embodiment, node 200b includes a splitter 202, an optical supervisory module 203, an optical amplifier 230, an optical add/drop module 240, a node output power monitor 250, and an adder 212. In general, node 200b uses information received on OSC 110 from node 200a combined with measured power levels at node 200b to control gain of amplifier 230.

Splitter 202 represents any hardware and/or software for separating the information in OSC 110 from the information communicated in other portions of optical signal 104. In one embodiment, splitter 202 optically separates the wavelength carrying OSC 110 and routes the information to an optical supervisory module (OSM) 204 for use in management of network node 200. Splitter 202 may include optical components as filters, prisms, diffraction gratings, or other suitable components for separating and redirecting light. In addition, splitter 202 may include electronic components, such as optical-electronic converters, that convert optical signals into electronic signals and process those electronic signals.

OSM 203 represents any hardware and/or software that interprets information OSC 110 and controls various components of node 200b in response to the information. OSM 203 also receives information from components of node 200b that is used to update the information in OSC 110. Accordingly, OSM 203 may include any suitable components for extracting information from optical and/or electronic signals, adding information to optical and/or electronic signals, and exchanging information with other components of node 200.

Amplifier 230 represents hardware and/or software used to determine a gain for input optical signal 220 and to apply that gain to signal 220. In the depicted embodiment, amplifier 230 is an EDF amplifier that includes amplifier gain media 206A and 206B (collectively referred to as "amplifier gain media" 206), a variable attenuator 208, power monitors 204 and 210, and an amplifier controller 213. Although a particular embodiment of amplifier 230 is described, it should be understood that the techniques described may be adaptable to other optical amplifiers as well.

Amplifier gain media 206 represent any suitable components for amplifying the power level of input signal 220. In a particular embodiment, amplifier gain media 206 are erbium-doped fibers that amplify signals and compensate for power tilt using resonance effects. The amount of EDFA gain produced by amplifier gain media 206 is controlled by controlling the power of a pumping laser (not shown) coupled to amplifier gain media 206. In the depicted embodiment, amplifier gain media 206 are in a two-stage configuration, but it should be understood that the techniques described are adaptable to single-stage or multi-stage configurations as well.

Variable attenuator 208 represents any component for reducing the power level of input signal 220. Variable attenuator 208 allows node 200 to impart a loss to input signal 220 that is uniform across all channels. This is useful because controlling the overall gain of the EDFA using variable attenuator 208 will not change the population inversion conditions in amplifier gain media 206. This allows uniform gain across the signal band regardless of the overall EDFA gain. By imparting a uniform loss, variable attenuator 208 adjusts the overall power level without upsetting the balance in channel power produced by EDFA.

Amplifier controller 213 controls the operation of amplifier gain media 206 and variable attenuator 208 to produce a selected level of EDFA gain. In general, controller 213 operates to maintain the power levels of channels 108 in optical signal 104 in an appropriate power range despite phenomena such as span loss and component loss, which may include such tasks as controlling the pumping lasers for amplifier gain media 206, receiving information relevant to determining gain (such as power levels and/or number of channels), and other related tasks. Accordingly, controller 213 may include any suitable hardware and/or software components for performing these and other related functions, including processors, memory (whether volatile or nonvolatile), and communication interfaces. In the depicted embodiment, amplifier controller 213 includes an automatic gain control (AGC) 214 and an automatic level control (ALC) 216. AGC 214 refers to the hardware and/or software that manages amplifier gain media 206, and ALC 216 refers to the hardware and/or software for adjusting the attenuation level of variable attenuator 208. AGC 214 and ALC 216 may have separate components or may share some or all of their respective hardware and/or software components.

Power monitors 204 and 210 represent any components for detecting a power level of optical signal 104. Power monitors 204 and 210 may include photodiodes, CCDs, light meters, or other suitable hardware and/or software for detecting an input power level 218 of input signal 220. Power monitors 204 and 218 communicate measured power levels to other components of node 200b. Input power monitor 204 measures an input power level 218 for input signal 220 and provides input power level 218 to controller 213. Post-amp power monitor 210 measures a post-amplification ("post-amp") power level 225 for amplified signal 222 and communicates post-amp power level 225 to controller 213 in order to permit adjustment of gain level using amplifiers 206 and variable attenuator 208.

Optical add/drop module 240 adds and/or removes information from amplified signal 222 in a manner determined by the provisioning in network 100. In particular embodiments, add/drop module 240 may add or remove not only information but also actual channels 108 from optical signal 104. Add/drop module 240 may include any suitable hardware and/or software components, such as optical multiplexers, transponders, switches, or other optical or electronic components. Add/drop module 240 operates most effectively when the channel power of each channel 108 in a received optical signal 104 falls within a certain range. Thus, it is desirable for the EDFA gain of amplifier 230 to be set such that the channel power of each channel 208 in amplified signal 222 falls within the appropriate range.

Node output power monitor 250 is a component for measuring the power of an output signal 223 of node 200b. Power monitor 250 may include any suitable component for measuring the power of output signal 223, including any of the devices listed above in the description of power monitors 204 and 210. Because add/drop module 240 may add or remove channels from signal 222, the node output power level 224b measured by power monitor 250 may not be the same as the post-amp power level 225 measured by post-amp power monitor 210. Power monitor 250 also includes suitable components for communicating output power level 224b to OSM 110.

Adder 212 represents any component for recombining OSC 110 with optical signal 104 for communication to the next network node 200 in network 100. Adder 212 may include any suitable optical and/or electronic components for adding OSC 110 back into optical signal 104, and in particular may include corresponding components to splitter 202. In particular embodiments, adder 212 functions bidirectionally so that adder 212 may also receive signals from network node 200c and communicate optical supervisory channel 110 to OSM 203, and splitter 202 may receive signals from OSM 203 and communicate those signals to previous network node 200a. Such embodiments are useful in cases where fibers 102 are bidirectional, or when protection switching is triggered. In such cases, amplifiers 206, variable attenuator 208, and power monitors 204 and 210 may also be bidirectional, or alternatively, may be replicated in an opposite path. For simplicity in description, node 200b is described in terms of a unidirectional system, but it should be understood that the techniques described apply equally to bidirectional network nodes.

In operation, node 200b receives an optical signal 104 from previous network node 200a in network 100. Optical signal 104 includes the output power level 224a from upstream node 200a in OSC 110 of optical signal 104. Splitter 202 extracts OSC 110 and communicates OSC 110 to OSM 203. Splitter 202 communicates the remainder of optical signal 104 as input signal 220 to input power monitor 204. Input power monitor 204 measures input power level 218 of input signal 220, and communicates the information to controller 213. OSM 203 similarly extracts output power level 224a of upstream node 200a, as well as any other useful information, such as the number of provisioned channels, and communicates the information to controller 213.

Controller 213 uses information received from input power monitor 204, OSM 203, and/or output monitor 210 to determine a total gain for input signal 220, and adjusts amplifiers 206 and variable attenuator 208 accordingly. In particular, controller 213 may use output power level 224a of upstream node 200a as a target post-amp power level 225 for node 200b. Controller 213 may use input power level 218 of input signal 220 to determine a gain that will be required to produce signals with post-amp power level 225 matching output power level 224a of upstream node 200a. Furthermore, controller 213 may take into account other factors, such as the number of channels provisioned, whether channels were added and/or dropped, what the known or estimated amount of loss from traveling through node 200 is, what level of ASE may be expected, or any other helpful or useful piece of information for determining a total gain.

Amplifiers 206 and variable attenuator 208 amplify input signal 220 under the control of controller 213 to produce amplified signal 222. Once amplification is complete, post-amp power monitor 210 measures post-amp power level 225 of amplified signal 222. Add/drop module 240 receives amplified signal 222 and adds or removes information and/or channels to produce output signal 223 of node 200b.

Power monitor 250 measures output power level 224b of output signal 223 and communicates output power level 224b to OSM 203. OSM 203 in turn inserts output power level 224b into OSC 110. OSC 110 is added back to optical signal 104 by adder 212. Optical signal 104 is then communicated to the next network node 200c in optical network 100. Node 200c in turn uses output power level 224b in the gain-determination process and so on throughout network 100, and thus allowing the described operation to be performed by all nodes 200 in network 100. In particular embodiments, the output power level 224b and/or gain may also be communicated to upstream node 200a as well, permitting the gain to be set for the upstream direction even when a signal is not being communicated along that path.

Figure 3:
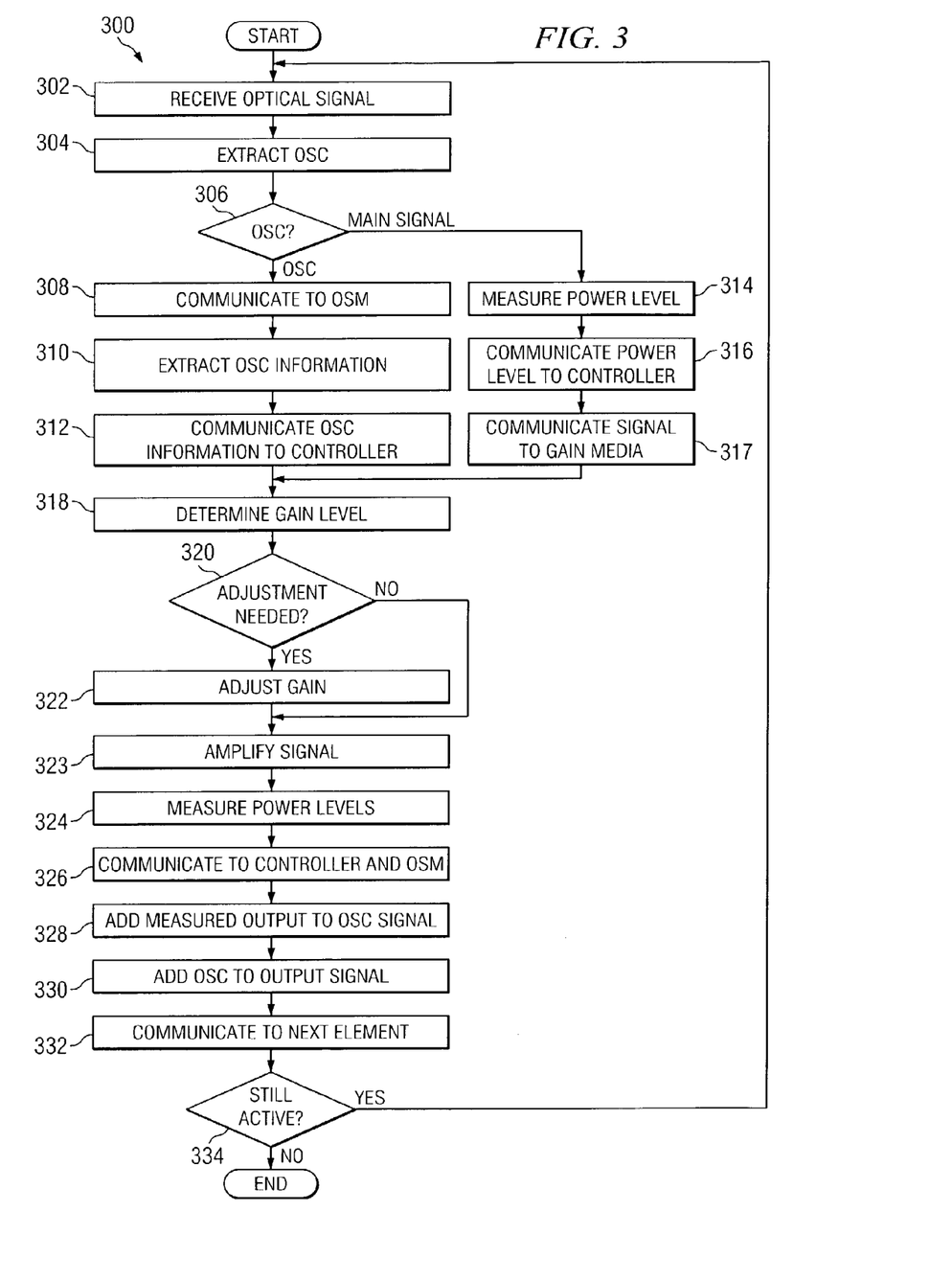
FIG. 3 is a flow chart illustrating a method of operation for the network node of FIG. 2.

FIG. 3 is a flow chart 300 illustrating one example of a method of operation for node 200b. Node 200b receives an optical signal 104 from upstream node 200a at step 302.

Node 200b extracts OSC 110 from optical signal 104 at step 304. OSC 110 and the input signal 220 are then processed separately as shown by decision step 306.

OSC 110 is communicated to OSM 203 at step 308. OSM 203 extracts OSC information from OSC 110 at step 310. OSC information may include the number of channels provisioned as well as output power level 224a for upstream node 200a. OSM 203 then communicates OSC information to controller 213 at step 312.

The remaining portion of optical signal input signal 220 is processed as follows. Power level 218 of input in signal 220 is measured by power monitor 204 at step 314. Power monitor 204 communicates input power level 218 to controller 213 at step 316. Input signal 220 is then communicated to gain medium 206a at step 317. Based on information that controller 213 has received, controller 213 determines an appropriate gain level for input signal 220 at step 318. Controller 213 determines whether adjustments are needed in gain media 206 or variable attenuator 208, respectively, at step 320. Controller 213 performs any needed adjustments at step 322.

Node 200b amplifies input signal 220 at step 323 using amplifiers 206 and variable attenuator 208. Power monitors 210 and 250 measure the post-amplification power 225 and output power level 244, respectively, at step 324. Post-amp power monitor 210 communicates post-amp power level 225 to controller 213 and output power level 224b and communicates output power level 224b to OSM 203, as shown in step 326. OSM 203 adds output power level 224b to the information in OSC 110 at step 328 for use by next node 200c.

Adder 212 recombines the updated OSC 110 with output signal 104 at step 330. Optical signal 104 is then communicated to next node 200c in network 100 at step 332. Node 200c uses this output power level 224b in a similar fashion to the process described above. This process may be repeated for each node 200 in network 200, such that each node 200 receives output power 224 from the node 200 upstream from it. If signal 104 remains active at decision step 334, then node 200b may continue to repeat the method from step 302. Otherwise, the method is at an end.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for determining gain for an optical signal, comprising:
    measuring a first power level comprising an output power level of an optical signal at a first optical node;
    communicating the optical signal to a second optical node, wherein the optical nodes are in a bidirectional network communicating signals in a first direction and a second direction, and wherein the optical signal communicated from the first node to the second node is communicated in the first direction;
    communicating the first power level to the second optical node in an optical supervisory channel of the optical signal;
    receiving the optical signal at the second optical node;
    measuring a second power level of the optical signal at the second optical node;
    determining a gain for the optical signal based on the first and second power levels; and
    communicating the determined gain from the second node to the first node to enable the first node to set a gain for the second direction to match the gain in the first direction determined at the second node.

2. The method of claim 1, wherein:
    the second power level comprises an input power level for the optical signal at the second optical node; and
    determining the gain for the optical signal comprises:
        subtracting the second power level from the first power level to determine a span loss; and
        determining the gain based on a span loss and a known component loss of the second optical node.

3. The method of claim 1, further comprising adjusting a gain for an amplifier based on the gain determined for the optical signal.

4. The method of claim 1, wherein:
    the second power level comprises a post-amplification power level of the optical signal at the second optical node; and
    the step of determining a gain comprises determining a gain that equalizes the first and second power levels.

5. An optical node, comprising:
    an optical supervisory module configured to receive an output power level for an optical signal at an upstream node in an optical network, wherein the optical network is a bidirectional network communicating signals in a first direction and a second direction, and wherein the optical signal is communicated in the first direction to the optical node by the upstream node and the output power level is communicated in an optical supervisory channel of the optical signal;
    a power monitor configured to measure a power level for the optical signal received by the optical node; and
    a controller configured to determine a gain for the optical signal based on the output power level and the measured power level and to communicate the determined gain to the upstream node to enable the upstream node to set a gain for the second direction to match the gain in the first direction determined at the optical node.

6. The node of claim 5, further comprising a splitter configured to extract the optical supervisory channel from the optical signal and to communicate the optical supervisory channel to the optical supervisory module.

7. The node of claim 5, wherein:
    the power monitor measures an input power level for the optical signal at the optical node; and
    the controller is further configured to subtract the input power level from the output power level to determine a span loss, wherein the controller determines the gain based on the span loss and a known component loss of the optical node.

8. The node of claim 5, wherein:
    the power monitor measures a post-amplification power level for the optical signal; and
    the controller determines the gain by matching the post-amplification power level to the output power level at the upstream node.

9. The node of claim 5, wherein:
    the node further comprises an amplifier; and
    a gain of the amplifier is set based on the gain determined by the controller.

10. A system, comprising:
    a first optical node configured to communicate an optical signal, the first optical node comprising a first power monitor configured to measure a first power level comprising an output power level for the optical signal at the first optical node, the first optical node further configured to communicate the first power level in an optical supervisory channel of the optical signal;

a second optical node, comprising:
an optical supervisory module configured to receive the first power level from the first optical node;
a second power monitor configured to measure a second power level for the optical signal; and
a controller operable to determine a gain for the optical signal based on the first and second power levels;

wherein the first and second optical nodes are in a bidirectional optical network communicating signals in a first direction and a second direction, and wherein the optical signal communicated from the first optical node to the second optical node is communicated in the first direction; and wherein the controller of the second optical node is further configured to communicate the gain to the first optical node to enable the first optical node to set a gain for optical signals in the second direction to match the gain for optical signals in the first direction determined at the second optical node.

11. The system of claim 10, wherein:
the second optical node further comprises an amplifier; and
the gain of the amplifier is set based on the gain determined by the controller.

12. The system of claim 10, wherein:
the second power level comprises an input power level at the second optical node; and
the controller is further configured to subtract the input power level from the output power level to determine a span loss, wherein the controller determines the gain based on the span loss and a known component loss.

13. The system of claim 10, wherein:
the second power level comprises a post-amplification power level at the second optical node; and
the controller determines the gain by matching the post-amplification power level to the output power level of the first optical node.

* * * * *